(12) United States Patent
Schwede et al.

(10) Patent No.: US 9,284,395 B2
(45) Date of Patent: Mar. 15, 2016

(54) CONTINUOUS PROCESS FOR PREPARING COPOLYMERS

(71) Applicant: Construction Research & Technology, GmbH, Trostberg (DE)

(72) Inventors: Christian Schwede, Weinheim (DE); Günter Kaiser, Ludwigshafen (DE); Andreas Brodhagen, Tiefenthal (DE); Mario Vierle, Wasserburg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/648,591

(22) PCT Filed: Dec. 9, 2013

(86) PCT No.: PCT/EP2013/075943
§ 371 (c)(1),
(2) Date: May 29, 2015

(87) PCT Pub. No.: WO2014/090743
PCT Pub. Date: Jun. 19, 2014

(65) Prior Publication Data
US 2015/0315318 A1 Nov. 5, 2015

(30) Foreign Application Priority Data

Dec. 11, 2012 (EP) .................................... 12196410

(51) Int. Cl.
*C08F 2/00* (2006.01)
*C08F 30/02* (2006.01)
(Continued)

(52) U.S. Cl.
CPC ....... *C08F 216/1416* (2013.01); *B01J 19/1818* (2013.01); *B01J 19/1837* (2013.01);
(Continued)

(58) Field of Classification Search
CPC  C08B 28/04; C08B 24/2648; C08B 24/2647; C08B 2103/40; C08B 2103/24; C08B 24/2658; C08B 14/28; C08B 20/008; C08F 216/1416; C08F 220/06; C08F 290/062; C08F 2216/1433; B01J 19/1837; B01J 19/1818; B01J 2219/00177; B01J 2219/00099; B01J 2219/00063
USPC .................................. 526/64, 317.1, 274, 286
See application file for complete search history.

(56) References Cited

U.S. PATENT DOCUMENTS

| 4,471,100 A | 9/1984 | Tsubakimoto et al. |
| 5,798,425 A | 8/1998 | Albrecht et al. |

(Continued)

FOREIGN PATENT DOCUMENTS

| EP | 1 218 427 B1 * | 10/2005 |
| EP | 2 113 519 A1 | 11/2009 |
| WO | WO 2009/100956 A2 | 8/2009 |

OTHER PUBLICATIONS

PCT/EP2013/075943—PCT International Search Report, mailed Mar. 21, 2014.

(Continued)

*Primary Examiner* — William Cheung
(74) *Attorney, Agent, or Firm* — Curatolo Sidoti Co., LPA; Joseph G. Curatolo; Salvatore A. Sidoti

(57) ABSTRACT

The present invention relates to a process for the continuous preparation of polymers in a polymerization apparatus, where the starting materials comprise at least one olefinically unsaturated polyether macromonomer and at least one olefinically unsaturated acid monomer and at least one free-radical initiator and the polymerization is carried out at temperatures in the range from −20 to +120° C., wherein the polymerization apparatus comprises at least one loop reactor which has at least one feed line for the starting materials and at least one outlet, where the loop reactor comprises at least one reaction zone which comprises internal cooling and mixing elements and which has a volume-based heat removal power of at least 10 kW/m³·K. Furthermore, the use of the polymer of the invention as dispersant for hydraulic binders is disclosed.

17 Claims, 1 Drawing Sheet

(51) Int. Cl.
| | |
|---|---|
| C08F 12/30 | (2006.01) |
| C08F 20/06 | (2006.01) |
| C08F 216/14 | (2006.01) |
| B01J 19/18 | (2006.01) |
| C04B 24/26 | (2006.01) |
| C04B 28/04 | (2006.01) |
| C08F 290/06 | (2006.01) |
| C08F 220/06 | (2006.01) |
| C04B 103/30 | (2006.01) |
| C04B 103/40 | (2006.01) |

(52) U.S. Cl.
CPC ......... *C04B24/2647* (2013.01); *C04B 24/2658* (2013.01); *C04B 28/04* (2013.01); *C08F 220/06* (2013.01); *C08F 290/062* (2013.01); *B01J 2219/00063* (2013.01); *B01J 2219/00099* (2013.01); *B01J 2219/00177* (2013.01); *C04B 2103/34* (2013.01); *C04B 2103/40* (2013.01); *C08F 2216/1433* (2013.01)

(56) References Cited

U.S. PATENT DOCUMENTS

| | | | |
|---|---|---|---|
| 6,211,317 | B1 | 4/2001 | Albrecht et al. |
| 6,214,958 | B1 | 4/2001 | Le-Khac et al. |
| 6,391,923 | B1 | 5/2002 | Pöllmann et al. |
| 6,815,513 | B2 | 11/2004 | Le-Khac et al. |
| 7,125,944 | B2 | 10/2006 | Yamashita et al. |
| 7,629,411 | B2 | 12/2009 | Becker et al. |
| 7,691,921 | B2 | 4/2010 | Asano et al. |
| 7,973,110 | B2 | 7/2011 | Lorenz et al. |
| 8,242,218 | B2 | 8/2012 | Lorenz et al. |
| 8,299,192 | B2 | 10/2012 | Kraus et al. |
| 8,349,983 | B2 | 1/2013 | Lorenz et al. |
| 8,361,302 | B2 | 1/2013 | Grassl et al. |
| 8,536,252 | B2 | 9/2013 | Albrecht et al. |
| 8,536,285 | B2 | 9/2013 | Dorfner et al. |
| 8,541,518 | B2 | 9/2013 | Albrecht et al. |
| 8,648,158 | B2 | 2/2014 | Schwede et al. |
| 2003/0162879 | A1 | 8/2003 | Laubender et al. |
| 2006/0281885 | A1 | 12/2006 | Bichler et al. |
| 2006/0281886 | A1 | 12/2006 | Bichler et al. |
| 2007/0161724 | A1 | 7/2007 | Moraru et al. |
| 2009/0163622 | A1 | 6/2009 | Albrecht et al. |
| 2011/0034625 | A1 | 2/2011 | Grassl et al. |
| 2011/0190422 | A1 | 8/2011 | Schwede et al. |
| 2011/0306696 | A1 | 12/2011 | Flakus et al. |
| 2012/0035301 | A1 | 2/2012 | Vierle et al. |

OTHER PUBLICATIONS

PCT/EP2013/075943—PCT International Written Opinion, mailed Mar. 21, 2014.

PCT/EP2013/075943—PCT International Preliminary Report on Patentability, issued Jun. 16, 2015.

\* cited by examiner

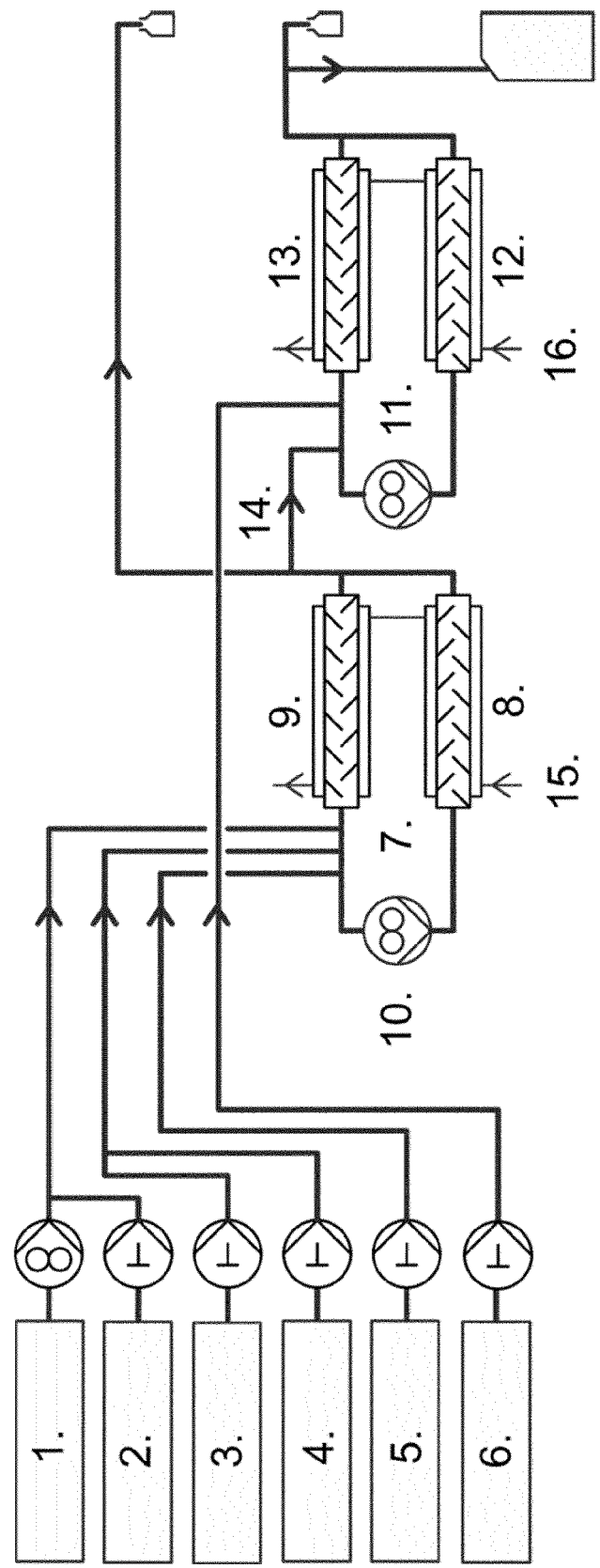

CONTINUOUS PROCESS FOR PREPARING COPOLYMERS

CROSS REFERENCE TO RELATED APPLICATIONS

This application is a national stage application of International Application No. PCT/EP2013/075943, filed 9 Dec. 2013, which claims priority from European Patent Application No. 12196410.0, filed 11 Dec. 2012, from which applications priority is claimed, and which are incorporated herein by reference.

The present invention relates to a process for the continuous preparation of a copolymer, wherein the polymerization apparatus comprises a loop reactor comprising at least one reaction zone with internal cooling and mixing elements and which has a volume-based heat removal power of at least 10 kW/m$^3$·K. Furthermore, the copolymer according to the invention and its use as dispersant for hydraulic binders are disclosed.

It is known that additives in the form of dispersants are often added to aqueous slurries of pulverulent inorganic or organic substances such as clays, ground silicate, chalk, carbon black, ground rock and hydraulic binders in order to improve their processability, i.e. kneadability, paintability, sprayability, pumpability or flowability. Such additives are able to break up agglomerates of solids, to disperse the particles formed and in this way to improve the processability. This effect is exploited, in particular, in a targeted manner in the production of building material mixtures comprising hydraulic binders such as cement, lime, gypsum or anhydride.

To convert these building material mixtures based on the abovementioned binders into a ready-to-use, processable form, it is generally necessary to use significantly more make-up water than would be required for the subsequent hydration or curing processes. The void volume formed in the concrete body as a result of the excess water which evaporates later leads to significantly impaired mechanical strengths and resistances.

To reduce this excess water at a prescribed processing consistence and/or improve the processability at a prescribed water/binder ratio, additives which are generally referred to as water reduction agents or plasticizers are used. Copolymers which are prepared by free-radical copolymerization of acid monomers with polyether macromonomers are frequently used in practice as such agents. The copolymerization is usually carried out either in the batch mode or in the semibatch mode.

EP-B-1 218 427 describes a continuous process for preparing said copolymers which, as plasticizers/water reduction agents, are said to display better performance than corresponding copolymers which have been prepared in batch or semibatch operation. In the continuous production process described in EP-B-1 218 427, a monomer stream comprising an acid monomer and a polyether macromonomer is firstly produced. This previously produced monomer stream comprising acid monomer and polyether macromonomer is polymerized by means of an initiator stream in a reaction zone, and a polymer stream is finally taken off from the reaction zone.

EP 2 113 519 describes a process for preparing said copolymers, wherein electrochemically generated radicals are used to initiate the radical polymerization. It is further mentioned that virtually all known continuous process apparatuses can be equipped with corresponding electrolysis cells or may even be part of electrolysis cells. In this context, tubular and tube-bundle reactors, loop reactors and spinning-disc reactors are mentioned.

WO 2009/100956 likewise describes a continuous process for preparing copolymers on the basis of acid monomers and polyether macromonomers. The significant difference from EP-B-1 218 427 is the separate addition of acid monomer and polyether macromonomer. In this way, undesirable secondary reactions between acid monomer and polyether macromonomer can be avoided.

Furthermore, there is a need to provide more efficient continuous processes for the preparation of copolymers based on acid monomers and polyether macromonomers. In particular, the space-time yield should be increased and the performance of the plasticizers produced should be improved further.

It was therefore an object of the present invention to provide a process which improves the efficiency of the preparation of copolymers further, with the copolymers displaying good performance as dispersants for hydraulic binders, especially as plasticizers/water reduction agents.

This object is achieved by a process for the continuous preparation of polymers in a polymerization apparatus, where the starting materials comprise at least one olefinically unsaturated polyether macromonomer and at least one olefinically unsaturated acid monomer and at least one free-radical initiator and the polymerization is carried out at temperatures in the range from −20 to +120° C., wherein the polymerization apparatus comprises at least one loop reactor which has at least one feed line for the starting materials and at least one outlet, where the loop reactor comprises at least one reaction zone with internal cooling and mixing elements and the at least one reaction zone has a volume-based heat removal power of at least 10 kW/m$^3$·K.

It has surprisingly been found that significantly lower residence times and thus higher space-time yields compared to the prior art can be achieved in a polymerization apparatus comprising a loop reactor comprising at least one reaction zone with internal cooling and mixing elements and which has a volume-based heat removal power of at least 10 kW/m$^3$·K. Preference is here given to configurations comprising at least one reaction zone having a volume-based heat removal power of at least 15 kW/m$^3$·K. The range is particularly preferably from 10 to 2000 kW/m$^3$·K. In a particularly preferred embodiment, the overall loop reactor has a volume-based heat removal power of at least 20 kW/m$^3$·K, particularly preferably in the range from 20 to 1000 kW/m$^3$·K.

Such heat transfer powers cannot be achieved using conventional reactors as described, for example, in WO 2009/100956. The loop reactors according to the invention comprise at least one reaction zone with internal cooling and mixing elements over which the reaction medium flows by convection in the mixing section and which has a volume-based heat removal power of at least 10 kW/m$^3$·K. This can be achieved, for example, by integration of a tube reactor having cooling and mixing elements into the loop reactor, where the tube reactor can be, for example, a tube reactor of the type CSE-XR from Fluitec Georg AG or an SMR reactor from Sulzer. In a particularly preferred embodiment, the loop reactor according to the invention comprises a plurality of tube reactors having cooling and mixing elements which are joined to one another in a circular fashion. In particular, the polymerization apparatus can comprise a loop reactor which is made up of a plurality of tube reactors having cooling and mixing elements which are connected to one another in a circular fashion. In particular, there can be 2, 3, 4, 5 or 6 tube reactors.

The internal cooling elements not only enable a very large area for heat exchange between cooling medium and reaction mixture to be generated and a high heat transfer power thus to be achieved but the cooling elements at the same time ensure and improve mixing of the reaction mixture. The simultaneous mixing and heat removal thus makes a high level of heat removal possible at low temperature differences between cooling medium and reaction mixture. This is in turn an important prerequisite for keeping the continuous reaction in a narrow temperature window independently of the exact throughput.

The loop reactor thus preferably allows tight temperature control, i.e. an increase in the temperature during the reaction of less than 10° C., particularly preferably less than 5° C.

In a preferred embodiment, the loop reactor comprises an apparatus for circulating the reaction medium. In particular, such devices are gear pumps.

The loop reactor according to the invention leads to backmixing of the reaction medium. As a result, the concentration of the olefinically unsaturated polyether macromonomer in the reaction solution can be set to a very low value. This makes it possible to suppress secondary reactions, for example the hydrolysis reaction of the polyether macromonomers, and at the same time make high conversions to the desired polymers possible.

The polymerization apparatus can optionally have at least one continuously operated reactor which is located downstream of the polymerization reactor and into which the copolymer-comprising reaction composition is introduced via the outlet of the loop reactor. Monomeric starting materials and/or initiator components can then be introduced into the downstream reactor in order to increase the conversion.

For the purposes of the present invention, the term olefinically unsaturated acid monomer refers to free-radically copolymerizable monomers which have at least one carbon double bond and comprise at least one acid function and act as acid in an aqueous medium. Furthermore, the term acid monomer also encompasses free-radically copolymerizable monomers which have at least one carbon double bond and form at least one acid function as a result of a hydrolysis reaction in an aqueous medium and react as acids in an aqueous medium (for example: maleic anhydride). Olefinically unsaturated polyether macromonomers for the purposes of the present invention are free-radically copolymerizable compounds which have at least one carbon double bond and at least two ether oxygens, with the proviso that the polyether macromonomer structural units comprised in the copolymer have side chains which comprise at least two ether oxygens.

In a preferred embodiment of the invention, the acid monomer is reacted by polymerization so as to produce a structural unit having one of the general formulae (Ia), (Ib), (Ic) and/or (Id) in the copolymer,

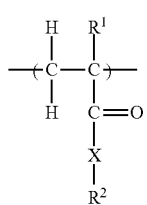
(Ia)

where
the radicals $R^1$ are identical or different, i.e. are either identically or differently substituted within the copolymer, and are each H and/or an unbranched or branched $C_1$-$C_4$-alkyl group, preferably H or $CH_3$;

the radicals X are identical or different and are each NH—$(C_nH_{2n})$ where n=1, 2, 3 or 4 and/or O—$(C_nH_{2n})$ where n=1, 2, 3 or 4, preferably NH—$C_4H_8$, and/or an absent unit, i.e. X is not present;

the radicals $R^2$ are identical or different and are each OH, $SO_3H$, $PO_3H_2$, O—$PO_3H_2$ and/or para-substituted $C_6H_4$—$SO_3H$, with the proviso that when X is an absent unit, $R^2$ is OH;

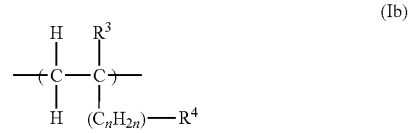
(Ib)

where
the radicals $R^3$ are identical or different and are each H and/or an unbranched or branched $C_1$-$C_4$-alkyl group, preferably $CH_3$;
n=0, 1, 2, 3 or 4
the radicals $R^4$ are identical or different and are each $SO_3H$, $PO_3H_2$, O—$PO_3H_2$ and/or para-substituted $C_6H_4$—$SO_3H$;

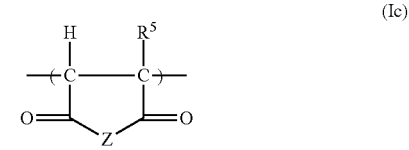
(Ic)

where
the radicals $R^5$ are identical or different and are each H and/or an unbranched or branched $C_1$-$C_4$-alkyl group, preferably H;
the radicals Z are identical or different and are each O and/or NH;

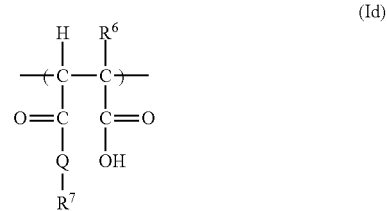
(Id)

where
the radicals $R^6$ are identical or different and are each H and/or an unbranched or branched $C_1$-$C_4$-alkyl group, preferably H;
the radicals Q are identical or different and are each NH and/or O;
the radicals $R^7$ are identical or different and are each H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$PO_3H_2$ and/or $(C_mH_{2m})_e$—O—$(A'O)_\alpha$—$R^9$ where m=0, 1, 2, 3 or 4, e=0, 1, 2, 3 or 4, A'=$C_{x'}H_{2x'}$ where x'=2, 3, 4 or 5, preferably x'=2, and/or $CH_2C(C_6H_5)H$—, $\alpha$=an integer from 1 to 350, preferably $\alpha$=15-200, where the radicals $R^9$ are identical or different and are each an unbranched or branched $C_1$-$C_4$-alkyl group, preferably $CH_3$.

As regards $R^2$, $R^4$ and $R^7$ in the structural formulae Ia, Ib and Id, it should be pointed out that the corresponding acid functions can, particularly when bases are added, be in deprotonated form in the polymer, i.e. in the form of the salts.

The expression "identical or different" used above and below in each case indicates constancy or variability within the copolymer produced by the process of the invention.

In practice, methacrylic acid, acrylic acid, maleic acid, maleic anhydride, a monoester of maleic acid or a mixture of a plurality of these components is frequently used as acid monomer.

In a preferred embodiment of the invention, the polyether macromonomer is reacted by polymerization so as to produce a structural unit having one of the general formulae (IIa), (IIb), (IIc) and/or (IId) in the copolymer,

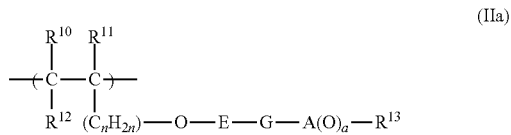

(IIa)

where
$R^{10}$, $R^{11}$ and $R^{12}$ are in each case identical or different and are each, independently of one another, H and/or an unbranched or branched $C_1$-$C_4$-alkyl group, preferably H and/or $CH_3$;
the radicals E are identical or different and are each an unbranched or branched $C_1$-$C_6$-alkylene group, in particular typically $C_1$, $C_2$, $C_3$, $C_4$, $C_5$ or $C_6$ but preferably $C_2$ and $C_4$, a cyclohexyl group, $CH_2$—$C_6H_{10}$, ortho-, meta- or para-substituted $C_6H_4$ and/or an absent unit, i.e. E is not present;
the radicals G are identical or different and are each O, NH and/or CO—NH, with the proviso that when E is an absent unit, G is also an absent unit, i.e. G is not present;
the radicals A are identical or different and are each $C_xH_{2x}$ where x=2, 3, 4 and/or 5, preferably x=2 and/or $CH_2CH$ $(C_6H_5)$;
the indices n are identical or different and are each 0, 1, 2, 3, 4 and/or 5;
the indices a are identical or different and are each an integer from 2 to 350, preferably 10-200;
the radicals $R^{13}$ are identical or different and are each H, an unbranched or branched $C_1$-$C_4$-alkyl group, CO—$NH_2$ and/or $COCH_3$, preferably H, $CH_3$;

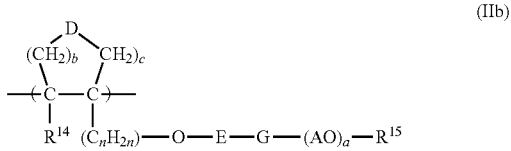

(IIb)

where
the radicals $R^{14}$ are identical or different and are each H and/or an unbranched or branched $C_1$-$C_4$-alkyl group, preferably H;
the radicals E are identical or different and are each an unbranched or branched $C_1$-$C_6$-alkylene group, preferably $C_2H_4$, a cyclohexyl group, $CH_2$—$C_6H_{10}$, ortho-, meta- or para-substituted $C_6H_4$ and/or an absent unit, i.e. E is not present;
the radicals G are identical or different and are each an absent unit, O, NH and/or CO—NH, with the proviso that when E is an absent unit, G is also an absent unit, i.e. G is not present;

the radicals A are identical or different and are each $C_xH_{2x}$ where x=2, 3, 4 and/or 5, preferably x=2, and/or $CH_2CH$ $(C_6H_5)$;
the indices n are identical or different and are each 0, 1, 2, 3, 4 and/or 5;
the indices a are identical or different and are each an integer from 2 to 350, preferably 10-200;
the radicals D are identical or different and are each an absent unit, i.e. D is not present, NH and/or O, with the proviso that when D is an absent unit: b=0, 1, 2, 3 or 4 and c=0, 1, 2, 3 or 4, where b+c=3 or 4, and with the proviso that when D is NH and/or O: b=0, 1, 2 or 3, c=0, 1, 2 or 3, where b+c=2 or 3;
the radicals $R^{15}$ are identical or different and are each H, an unbranched or branched $C_1$-$C_4$-alkyl group, CO—$NH_2$ and/or $COCH_3$, preferably H;

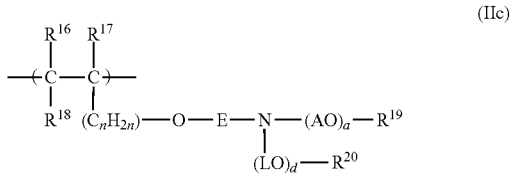

(IIc)

where
$R^{16}$, $R^{17}$ and $R^{18}$ are in each case identical or different and are each, independently of one another, H and/or an unbranched or branched $C_1$-$C_4$-alkyl group, preferably H and/or $CH_3$;
the radicals E are identical or different and are each an unbranched or branched $C_1$-$C_6$-alkylene group, preferably $C_2H_4$ or $C_4H_8$, a cyclohexyl group, $CH_2$—$C_6H_{10}$, ortho-, meta- or para-substituted $C_6H_4$ and/or an absent unit, i.e. E is not present;
the radicals A are identical or different and are each $C_xH_{2x}$ where x=2, 3, 4 and/or 5, preferably x=2 and/or $CH_2CH$ $(C_6H_5)$;
the indices n are identical or different and are each 0, 1, 2, 3, 4 and/or 5;
the radicals L are identical or different and are each $C_xH_{2x}$ where x=2, 3, 4 and/or 5, preferably x=2 and/or $CH_2$—CH $(C_6$—$H_5)$;
the indices a are identical or different and are each an integer from 2 to 350, preferably 10-200;
the indices d are identical or different and are each an integer from 1 to 350, preferably 10-200;
the radicals $R^{19}$ are identical or different and are each H and/or an unbranched or branched $C_1$-$C_4$-alkyl group, preferably H,
the radicals $R^{20}$ are identical or different and are each H and/or an unbranched $C_1$-$C_4$-alkyl group, preferably H.

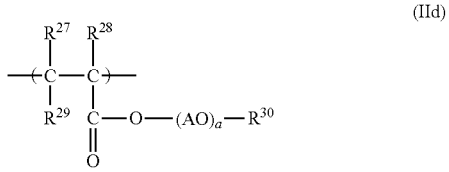

(IId)

where
$R^{27}$, $R^{28}$ and $R^{29}$ are identical or different and are each, independently of one another, H and/or an unbranched or branched $C_1$-$C_4$-alkyl group;
the radicals A are identical or different and are each $C_xH_{2x}$ where x=2, 3, 4 and/or 5 and/or $CH_2CH(C_6H_5)$;

the indices a are identical or different and are each an integer in the range from 2 to 350;

the radicals $R^{30}$ are identical or different and are each H and/or an unbranched or branched $C_1$-$C_4$-alkyl radical.

It can generally be said that the polyalkoxy side chains $(AO)_a$ of the polyether macromonomers are usually pure polyethoxy side chains but are not uncommonly also mixed polyalkoxy side chains, in particular polyalkoxy side chains comprising both propoxy and ethoxy groups.

In practice, alkoxylated isoprenol, i.e. alkoxylated 3-methyl-3-buten-1-ol and/or alkoxylated hydroxybutyl vinyl ether and/or alkoxylated (meth)allyl alcohol is frequently used as polyether macromonomer, with allyl alcohol being preferred over methalkyl alcohol and an arithmetic mean number of oxyalkylene groups of from 4 to 350 normally being used in each case. Particular preference is given to alkoxylated hydroxybutyl vinyl ether.

In addition to the acid monomer and the polyether macromonomer, further types of monomer can also be used. This is in practice generally done by introducing a vinylically unsaturated compound as monomeric starting material into the polymerization reactor and reacting it by polymerization so as to produce a structural unit having the general formula (IIIa) and/or (IIIb) in the copolymer,

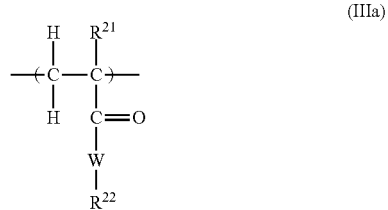
(IIIa)

where the radicals $R^{21}$ are identical or different and are each H and/or an unbranched or branched $C_1$-$C_4$ group, preferably H or $CH_3$;

the radicals W are identical or different and are each O and/or NH;

the radicals $R^{22}$ are identical or different and are each a branched or unbranched $C_1$-$C_5$-monohydroxyalkyl group, in particular typically $C_1$, $C_2$, $C_3$, $C_4$ or $C_5$ but preferably $C_2$ and/or $C_3$;

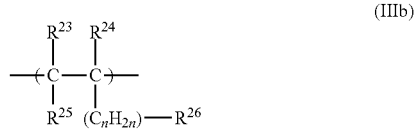
(IIIb)

where $R^{23}$, $R^{24}$ and $R^{25}$ are in each case identical or different and are each, independently of one another, H and/or an unbranched or branched $C_1$-$C_4$-alkyl group, preferably H and/or $CH_3$;

the indices n are identical or different and are each 0, 1, 2, 3 and/or 4;

the radicals $R^{26}$ are identical or different and are each $(C_6H_5)$, OH and/or $OCOCH_3$.

Typical monomers which can be polymerized to produce the structural units (IIIa) or (IIIb) are, for example, 2-hydroxypropyl acrylate, isoprenol or allyl alcohol. A further typical monomer in this context is hydroxybutyl vinyl ether.

A total of at least 45 mol % but preferably at least 80 mol % of all structural units of the copolymer produced by the process are normally produced by polymerization of acid monomer and polyether macromonomer.

In a preferred embodiment, the amount of polyether macromonomer introduced into the polymerization reactor per mole of acid monomer is such that an arithmetic mean molar ratio of acid monomer structural units to polyether macromonomer structural units of from 20:1 to 1:1, preferably from 12:1 to 1:1, is obtained in the copolymer formed.

In general, a redox initiator is used as free-radical polymerization initiator. In that case, the system $H_2O_2$/$FeSO_4$ is usually chosen, preferably together with a reducing agent, as redox initiator. Possible reducing agents are sodium sulfite, the disodium salt of 2-hydroxy-2-sulfinatoacetic acid, the disodium salt of 2-hydroxy-2-sulfonatoacetic acid, sodium hydroxymethanesulfinate, ascorbic acid, isoascorbic acid or mixtures thereof. Other systems, e.g. those based on t-butyl hydroperoxide, ammonium peroxodisulfate or potassium peroxodisulfate, are also possible as redox initiator system.

In a further embodiment, initiator components, e.g. $H_2O_2$, and the polyether macromonomer are introduced in premixed form in one stream into the polymerization reactor.

However, all compounds which disintegrate into free radicals under the polymerization conditions, e.g. peroxides, hydroperoxides, persulfates, azo compounds and perphosphates, can in principle be used as initiators. Combining the free-radical forms with suitable reducing agents gives known redox systems or redox catalysts. Suitable reducing agents are, for example, sodium sulfite, the disodium salt of 2-hydroxy-2-sulfonatoacetic acid, the disodium salt of 2-hydroxy-2-sulfinatoacetic acid, sodium hydroxymethanesulfinate, ascorbic acid, isoascorbic acid, amines such as diethanolamine or triethanolamine, hydroxylamine or mixtures thereof. When using redox systems or catalysts, it is advantageous to make additional use of water-soluble salts of transition metals such as iron, cobalt, nickel or silver, with preference being given to using iron salts.

A chain transfer agent, which is preferably present in dissolved form, is usually introduced into the polymerization reactor.

The monomeric starting materials and/or the initiator can be introduced in the form of their aqueous solutions into the polymerization reactor.

In a preferred embodiment, the at least one olefinically unsaturated polyether macromonomer and the at least one olefinically unsaturated acid monomer are fed into the loop reactor via different feed lines. As a result, secondary reactions and in particular hydrolysis of the polyether macromonomer by the acid monomer are avoided.

The product quality in carrying out the process of the invention is preferably monitored via continuous in-line monitoring of the quality of the starting materials, of the intermediates and in so far as necessary the reaction products. Here, different parameters can be examined or measured. Suitable measurement methods are all those which can detect the raw materials quality and/or the conversion in the reaction in a sufficiently short time. These are, for example, spectroscopic processes such as NIR spectroscopy, FT-IR spectroscopy, Raman FT spectroscopy, etc. The conversion in the reaction is preferably monitored. This can, for example, be carried out by Raman spectroscopy.

The copolymer of the invention can advantageously used as dispersant for hydraulic binders.

The process of the invention enables the copolymers of the invention to be prepared in a continuous process, where the process has the following advantages:

Constant and improved product quality, i.e. reduction in the secondary reactions, short thermal stress on starting materials and products, increased selectivity of the reaction.

High space-time yield, i.e. high quantity output combined with low reactor holdup. The continuous process in the loop reactor according to the invention is therefore also superior to the batch process or continuous batch process with regard to safety and toxicological aspects.

A further advantage of the continuous process of the invention is that the quality of the product obtained can be controlled by means of in-line analysis during the running production process by adaptation of reaction parameters such as residence time, temperature profiles, stoichiometry of the components used, etc. In addition, the process can be optimized more simply and efficient use of raw materials is therefore possible.

BRIEF DESCRIPTION OF THE FIGURES

FIG. 1 shows schematically a reactor comprising two loop reactors, where each loop consists of two mixer-heat exchanger.

The invention is illustrated below with the aid of examples.

EXAMPLES

Description of the Polymerization Apparatus Used

A production plant designed for the process of the invention for the continuous production of copolymers on production scale is shown schematically in FIG. 1. The reaction unit comprises two loop reactors (7 and 11). Each loop consists of two mixer-heat exchange reactors type XR-52-NS-LQ DN200 (Fluitec AG, Swizerland) (8 and 9, 12 and 13) with a length of 3250 mm and a volume of 74 l for each section., Both loops (7 and 11) are equipped with one centrifugical pump (10 and 11). The reactors are connected by a pipe (14).

The first loop reactor (7) is connected to the stock vessels of the reactants by means of pipes.

A defined mass flow can be set by means of intermediate pumps. The plant set-up comprises the following stock vessels: (1) for the aqueous solution of the vinyl ether component (the polyether macromonomer), alkali metal hydroxide solution and the initiator component 3 (reducing agent); (2) for an aqueous base solution for setting the pH required in the reaction, (3) for the aqueous solution of the acid monomer 2-propenoic acid (acrylic acid), (4) for the chain transfer components and the initiator component 2 ($Fe^{2+}$ salt), (5) for the first initiator component ($H_2O_2$), (6) for the initiator component 3 (reducing agent). The feed pipes for the stock vessels 1 and 2 and also 3 and 4 are in each case combined so that a total of three metering lines lead into the reactor 7, with the position and the depth to which the metering lines project into the reaction medium being selected so that the introduction into a zone occurs with high mixing efficiency. To ensure avoidance of premixing of acid monomer and polyether macromonomer, the monomers are introduced separately into the reactor. Reactor (11) is likewise connected by a line to the stock vessel (6) for reactants. A defined mass flow can be set by means of pumps which are likewise installed in between. To control the temperature of the reactors (7) and (11), they are connected to a temperature control system (15 and 16).

The reactors (7 and 11) each comprise a temperature sensor and in each case a sensor for determining the pH and for determining the redox potential in the reactant outlet. The loop reactors have a volume-based heat removal power of −80 $kW/m^3 \cdot K$.

Preparative Examples

Example 1

According to the Invention: Preparation of a Polymer in a Two-Stage Loop Reactor The apparatus is initially flushed with water and the reactors 7 and 11 are flooded with water. 2540 kg of $H_2O$ are placed in stock vessel 1 and 2756 kg of vinyloxybutylpoly (ethylene oxide) melt having a number average molar mass of 3000 $g \cdot mol^{-1}$ as polyether macromonomer and 5.39 kg of an aqueous KOH solution (50% strength by weight) are added while stirring. After cooling, 197.7 kg of a 3% strength aqueous solution of Rongalit C® (sodium hydroxymethylsulfinate, able to be procured from BASF SE) are stirred into the clear solution. Stock vessel 2 is charged with 100 kg of an aqueous NaOH solution (20% strength by weight). The sodium hydroxide solution serves to regulate the pH during the polymerization. 360 kg of $H_2O$ are placed in stock vessel 3 and 240 kg of the acid monomer 2-propenoic acid (acrylic acid) are introduced while stirring. 356 kg of water are placed in stock vessel 4 and 16 kg of MPA (3-mercaptopropanoic acid) and 28.3 kg of a 1.83% strength by weight aqueous solution of $FeSO_4 \cdot 7H_2O$ are added while stirring. Stock vessel 5 is filled with a 2% strength $H_2O_2$ solution (75 kg) and stock vessel 6 is charged with 485 kg of deionized water and 15 kg of Rongalit C®.

At the beginning of the reaction, the two centrifugical pumps and all pumps are started and the thermostat temperature is set so that the temperature of the reaction medium is a constant 15° C.

The streams of the reactants from stock vessels 1, 2, 3 and 4 are set so that the sum of the average residence times are 4 minutes in reactor 7 and 4 minutes in reactor 11. The stream from stock vessel 5 is set to 26.1 kg/h at the beginning of the polymerization. It is ensured that the introduction of the polyether macromonomer into the polymerization reactor is kept separate from that of the acid monomer in such a way that the polyether macromonomer is mixed with the initiator, monomeric starting materials and copolymer-comprising reaction composition in the polymerization reactor and only then comes into contact with the acid monomer. After setting the flows, samples are taken at time intervals corresponding to the sum of the average residence times of the reactors, the reaction and secondary reaction are stopped by means of an alkali 3% strength methoxyhydroquinone solution and the samples are analyzed by high-performance liquid chromatography (HPLC) and size exclusion chromatography (SEC or GPC). The steady state of the experiment is achieved when the shape of the gel chromatography elution curve (GPC curve) and the average molar mass values no longer change as a function of time. After reaching the steady state, a sample representative of the experimental conditions (polymer 1) is taken and analyzed by size exclusion chromatography and the molar mass distribution and the average thereof and also the conversion are determined. At the end of the reaction, all streams are set to zero and the apparatus is flushed with water.

Analysis of the Copolymers from Example 1

The polymers are analyzed with regard to average molar mass by means of size exclusion chromatography (column combination: Suprema 3000, Suprema 1000 and Suprema 30 from PSS, Mainz; Eluent: aqueous solution of $Na_2HPO_4$ (0.03 mol/l) and 0.5 g/l of sodium azide; injection volume 50 µl; flow rate 0.8 ml/min). Calibration to determine the average molar mass was carried out using linear poly(ethylene oxide) standards.

The following values were able to be determined:

| Polymer name | $\overline{M_w}/g \cdot mol-1$ |
|---|---|
| Polymer 1 (from example 1) | 46600 |

The conversions of low molecular weight monomers such as acrylic acid were determined by means of gradient high-performance liquid chromatography (HPLC). The conversions of macromonomer were determined by means of high-performance liquid chromatography at the critical point of polyethylene glycol ("HPLC-CC").

|  | Acrylic acid | Macromonomer |
|---|---|---|
| Conversion in the first loop reactor | 88% | 80% |
| Total conversion with second loop reactor | 96% | 93% |

Use Tests

The polymer according to the invention was examined in terms of its properties as concrete plasticizer in a suitable test system. For this purpose, the polymer was brought to a pH of 6.5±0.2 by means of a solution of NaOH in water and admixed with small amounts of a conventional antifoam to control the air pore content.

The following formulation was used for the tests:

| Starting material | Amount |
|---|---|
| Cement type CEM I 42,5R | 330 kg/m³ |
| Ground limestone | 80 kg/m³ |
| Sand, particle size 0-4 mm | 965 kg/m³ |
| Gravel, particle size 4-16 mm | 915 kg/m³ |
| Total water | 145 l/m³ (corresponds to w/c 0.44) |
| Polymer (active, based on 100% solids) | 0.495 kg/m³ |

In carrying out the tests, cement, ground limestone, sand and gravel were firstly mixed dry for 10 seconds; 15% of the water was then added and the mixture was mixed for 120 seconds. The remaining water and the amount of the respective polymer were subsequently added and the mixture was mixed for a further 120 seconds (corresponds to a water/cement ratio of 0.44 and an amount of polymer of 0.15% solids, based on the weight of cement introduced). The slump in accordance with DIN EN 12350-2 was subsequently determined both immediately after production and after 10 and 30 minutes. A commercial high-performance plasticizer from BASF, Glenium® ACE 430, was used as reference polymer and was employed in the same amount as the polymer according to the invention.

The following values were determined:

| | Slump/cm | | | |
|---|---|---|---|---|
| Polymer | After production | 10 minutes | 30 minutes | Comment |
| Reference | 59 | 43 | 31 | |
| Polymer according to the invention | 64 | 43 | 30 | No longer processable after 30 minutes |

At the same amount used, the polymer prepared according to the invention has a better plasticizing action immediately after production of the concrete compared to the reference polymer. Furthermore, it has a comparable maintenance of consistency.

The invention claimed is:

1. A process for the continuous preparation of polymers in a polymerization apparatus, where the starting materials comprise at least one olefinically unsaturated polyether macromonomer and at least one olefinically unsaturated acid monomer and at least one free-radical initiator and the polymerization is carried out at temperatures in the range from −20 to +120° C., wherein the polymerization apparatus comprises at least one loop reactor which has at least one feed line for the starting materials and at least one outlet, where the loop reactor comprises at least one reaction zone with internal cooling and mixing elements and the at least one reaction zone has a volume-based heat removal power of at least 10 kW/m³·K.

2. The process according to claim 1, wherein the olefinically unsaturated acid monomer is reacted by polymerization so as to produce a structural unit having one of the general formulae (Ia), (Ib), (Ic) and/or (Id) in the polymer,

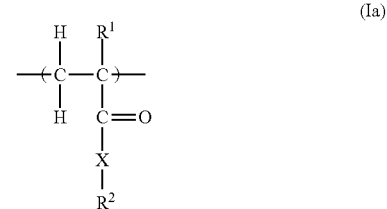

(Ia)

where
the radicals $R^1$ are identical or different, and are each H and/or an unbranched or branched $C_1$-$C_4$-alkyl group;
the radicals X are identical or different and are each NH—$(C_nH_{2n})$ where n=1, 2, 3 or 4 and/or O—$(C_nH_{2n})$ where n=1, 2, 3 or 4 and/or an absent unit;
the radicals $R^2$ are identical or different and are each OH, $SO_3H$, $PO_3H_2$, O—$PO_3H_2$ and/or para-substituted $C_6H_4$—$SO_3H$, with the proviso that when X is an absent unit, $R^2$ is OH;

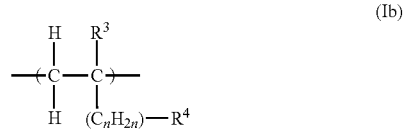

(Ib)

where
the radicals $R^3$ are identical or different and are each H and/or an unbranched or branched $C_1$-$C_4$-alkyl group;
n=0, 1, 2, 3 or 4
the radicals $R^4$ are identical or different and are each $SO_3H$, $PO_3H_2$, O—$PO_3H_2$ and/or para-substituted $C_6H_4$—$SO_3H$;

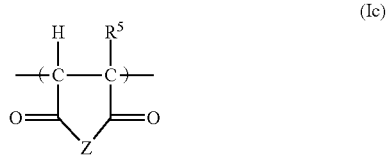

(Ic)

where
the radicals $R^5$ are identical or different and are each H and/or an unbranched or branched $C_1$-$C_4$-alkyl group;

the radicals Z are identical or different and are each O and/or NH;

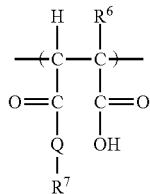

(Id)

where
the radicals $R^6$ are identical or different and are each H and/or an unbranched or branched $C_1$-$C_4$-alkyl group;
the radicals Q are identical or different and are each NH and/or O;
the radicals $R^7$ are identical or different and are each H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O—$(A'O)_\alpha$—$R^9$ where m=0, 1, 2, 3 or 4, e=0, 1, 2, 3 or 4, $A'=C_xH_{2x'}$ where x'=2, 3, 4 or 5 and/or $CH_2C(C_6H_5)H$—, α=an integer from 1 to 350 where the radicals $R^9$ are identical or different and are each an unbranched or branched $C_1$-$C_4$-alkyl group.

3. The process according to claim 1, wherein methacrylic acid, acrylic acid, maleic acid, maleic anhydride, a monoester of maleic acid or a mixture of a plurality of these components is used as the at least one acid monomer.

4. The process according to claim 1, wherein the polyether macromonomer is reacted by polymerization so as to produce a structural unit having one of the general formulae (IIa), (IIb), (IIc) and/or (IId) in the polymer,

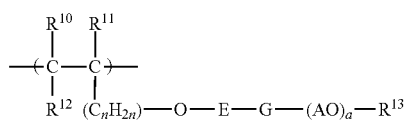

(IIa)

where
$R^{10}$, $R^{11}$ and $R^{12}$ are in each case identical or different and are each, independently of one another, H and/or an unbranched or branched $C_1$-$C_4$-alkyl group;
the radicals E are identical or different and are each an unbranched or branched $C_1$-$C_6$-alkylene group, a cyclohexyl group, $CH_2$—$C_6H_{10}$, ortho-substituted $C_6H_4$, meta-substituted $C_6H_4$ or para-substituted $C_6H_4$ and/or an absent unit;
the radicals G are identical or different and are each O, NH and/or CO—NH, with the proviso that when E is an absent unit, G is also an absent unit;
the radicals A are identical or different and are each $C_xH_{2x}$ where x=2, 3, 4 and/or 5 and/or $CH_2CH(C_6H_5)$;
the indices n are identical or different and are each 0, 1, 2, 3, 4 and/or 5;
the indices a are identical or different and are each an integer from 2 to 350;
the radicals $R^{13}$ are identical or different and are each H, an unbranched or branched $C_1$-$C_4$-alkyl group, CO—$NH_2$ and/or $COCH_3$;

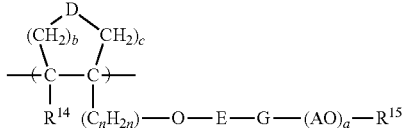

(IIb)

where
the radicals $R^{14}$ are identical or different and are each H and/or an unbranched or branched $C_1$-$C_4$-alkyl group;
the radicals E are identical or different and are each an unbranched or branched $C_1$-$C_6$-alkylene group, a cyclohexyl group, $CH_2$—$C_6H_{10}$, ortho-substituted $C_6H_4$, meta-substituted $C_6H_4$ or para-substituted $C_6H_4$ and/or an absent unit;
the radicals G are identical or different and are each an absent unit, O, NH and/or CO—NH, with the proviso that when E is an absent unit, G is also an absent unit;
the radicals A are identical or different and are each $C_xH_{2x}$ where x=2, 3, 4 and/or 5, and/or $CH_2CH(C_6H_5)$;
the indices n are identical or different and are each 0, 1, 2, 3, 4 and/or 5;
the indices a are identical or different and are each an integer from 2 to 350;
the radicals D are identical or different and are each an absent unit, NH and/or O, with the proviso that when D is an absent unit: b=0, 1, 2, 3 or 4 and c=0, 1, 2, 3 or 4, where b+c=3 or 4, and
with the proviso that when D is NH and/or O: b=0, 1, 2 or 3, c=0, 1, 2 or 3, where b+c=2 or 3;
the radicals $R^{15}$ are identical or different and are each H, an unbranched or branched $C_1$-$C_4$-alkyl group, CO—$NH_2$ and/or $COCH_3$;

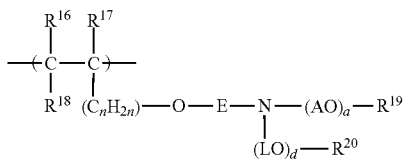

(IIc)

where
$R^{16}$, $R^{17}$ and $R^{18}$ are in each case identical or different and are each, independently of one another, H and/or an unbranched or branched $C_1$-$C_4$-alkyl group;
the radicals E are identical or different and are each an unbranched or branched $C_1$-$C_6$-alkylene group, a cyclohexyl group, $CH_2$—$C_6H_{10}$, ortho-, meta- or para-substituted $C_6H_4$ and/or an absent unit;
the radicals A are identical or different and are each $C_xH_{2x}$ where x=2, 3, 4 and/or 5, and/or $CH_2CH(C_6H_5)$;
the indices n are identical or different and are each 0, 1, 2, 3, 4 and/or 5;
the radicals L are identical or different and are each $C_xH_{2x}$ where x=2, 3, 4 and/or 5 and/or $CH_2$—$CH(C_6$—$H_5)$;
the indices a are identical or different and are each an integer from 2 to 350;
the indices d are identical or different and are each an integer from 1 to 350;
the radicals $R^{19}$ are identical or different and are each H and/or an unbranched or branched $C_1$-$C_4$-alkyl group,
the radicals $R^{20}$ are identical or different and are each H and/or an unbranched $C_1$-$C_4$-alkyl group,

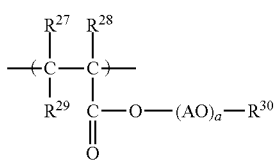

(IId)

where
R$^{27}$, R$^{28}$, and R$^{29}$ are identical or different and are each, independently of one another, H and/or an unbranched or branched C$_1$-C$_4$-alkyl group;
the radicals A are identical or different and are each C$_x$H$_{2x}$ where x=2, 3, 4 and/or 5 and/or CH$_2$CH(C$_6$H$_5$);
the indices a are identical or different and are each an integer in the range from 2 to 350;
the radicals R$^{30}$ are identical or different and are each H and/or an unbranched or branched C$_1$-C$_4$-alkyl radical.

5. The process according to claim 1, wherein alkoxylated isoprenol and/or alkoxylate hydroxybutyl vinyl ether and/or alkoxylate (meth)allyl alcohol optionally having in each case an arithmetic mean number of oxyalkylene groups of from 4 to 350 is/are used as polyether macromonomer.

6. The process according to claim 1, wherein a vinylically unsaturated compound is introduced as monomeric starting material into the polymerization reactor and is reacted by polymerization so as to produce a structural unit having the general formula (IIIa) and/or (IIIb) in the polymer,

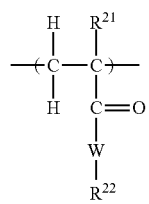

(IIIa)

where
the radicals R$^{21}$ are identical or different and are each H and/or an unbranched or branched C$_1$-C$_4$ group;
the radicals W are identical or different and are each O and/or NH;
the radicals R$^{22}$ are identical or different and are each a branched or unbranched C$_1$-C$_5$-monohydroxyalkyl group;

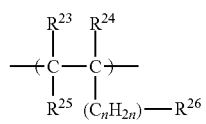

(IIIb)

where
R$^{23}$, R$^{24}$ and R$^{25}$ are in each case identical or different and are each, independently of one another, H and/or an unbranched or branched C$_1$-C$_4$-alkyl group;

the indices n are identical or different and are each 0, 1, 2, 3 and/or 4;
the radicals R$^{26}$ are identical or different and are each (C$_6$H$_5$), OH and/or —COCH$_3$.

7. The process according to claim 1, wherein the amount of olefinically unsaturated polyether macromonomer introduced into the polymerization reactor per mole of olefinically unsaturated acid monomer is such that an arithmetic mean molar ratio of acid monomer structural units to polyether macromonomer structural units of from 20:1 to 1:1 is obtained in the polymer formed.

8. The process according to claim 1, wherein a total of at least 45 mol % of all structural units of the polymer are produced by polymerization of olefinically unsaturated acid monomer and olefinically unsaturated polyether macromonomer.

9. The process according to claim 1, wherein at least one olefinically unsaturated polyether macromonomer and the at least one olefinically unsaturated acid monomer are fed separately into the loop reactor via different feed lines.

10. The process according to claim 1, wherein the loop reactor comprises a device for circulating the reaction medium.

11. The process according to claim 1, wherein the polymerization apparatus has at least one continuously operated reactor which is installed downstream of the loop reactor and into which the polymer-comprising reaction composition is introduced via the outflow from the loop reactor.

12. The process according to claim 11, wherein monomeric starting materials and/or initiator components are introduced into the downstream reactor.

13. The process according to claim 4, wherein in the structural unit having the general formulae (IIa), the radicals A are each C$_x$H$_{2x}$ where x=2.

14. The process according to claim 4, wherein in the structural unit having the general formulae (IIa), the indices a are identical or different and are each an integer from 10-200.

15. The process according to claim 1, wherein the amount of olefinically unsaturated polyether macromonomer introduced into the polymerization reactor per mole of olefinically unsaturated acid monomer is such that an arithmetic mean molar ratio of acid monomer structural units to polyether macromonomer structural units of from 12:1 to 1:1 is obtained in the polymer formed.

16. The process according to claim 1, wherein a total of at least 80 mol % of all structural units of the polymer are produced by polymerization of olefinically unsaturated acid monomer and olefinically unsaturated polyether macromonomer.

17. The process according to claim 1, wherein alkoxylated isoprenol and/or alkoxylate hydroxybutyl vinyl ether and/or alkoxylate (meth)allyl alcohol having in each case an arithmetic mean number of oxyalkylene groups of from 4 to 350 is/are used as polyether macromonomer.

* * * * *